United States Patent [19] [11] 3,909,807
Fulton [45] Sept. 30, 1975

[54] INTEGRATED CIRCUIT MEMORY CELL

[75] Inventor: Alan William Fulton, Batavia, Ill.

[73] Assignee: Bell Telephone Laboratories, Incorporated, Murray Hill, N.J.

[22] Filed: Sept. 3, 1974

[21] Appl. No.: 502,675

[52] U.S. Cl. ........ 340/173 FF; 340/173 R; 307/279
[51] Int. Cl.[2] ........ G11C 11/40
[58] Field of Search ........ 340/173 R, 173 FF; 307/238, 279, 299 R

[56] References Cited

UNITED STATES PATENTS

| | | | |
|---|---|---|---|
| 3,537,078 | 10/1970 | Pomeranz | 340/173 R |
| 3,564,300 | 2/1971 | Heule | 340/173 R |
| 3,575,741 | 4/1971 | Murphy | 148/175 |
| 3,643,230 | 2/1972 | Lynes | 340/173 R |
| 3,655,457 | 4/1972 | Duffy | 148/1.5 |

*Primary Examiner*—Terrell W. Fears
*Attorney, Agent, or Firm*—J. C. Albrecht

[57] ABSTRACT

A cell for an integrated circuit memory is formed of two interconnected identical halves. Each such half is integrally formed without surface metal interconnections. The memory is fabricated from a semiconductor body which comprises an epitaxial layer of one conductivity type overlying a semiconductor substrate of the opposite type. Each half comprises a vertical npn transistor having the collector thereof at the exposed surface of the epitaxial layer and a lateral current source transistor. The collector region of each vertical transistor has two metal contacts, one to form a Schottky diode to couple to a bit line, and one to form an ohmic connection for crosscoupling of the two halves. Power is distributed by a line diffused in the epitaxial layer which line comprises the emitters of the lateral current source transistors and power is returned through word lines which are formed in the substrate of the body prior to growth of the epitaxial layer.

6 Claims, 6 Drawing Figures

FIG. 1
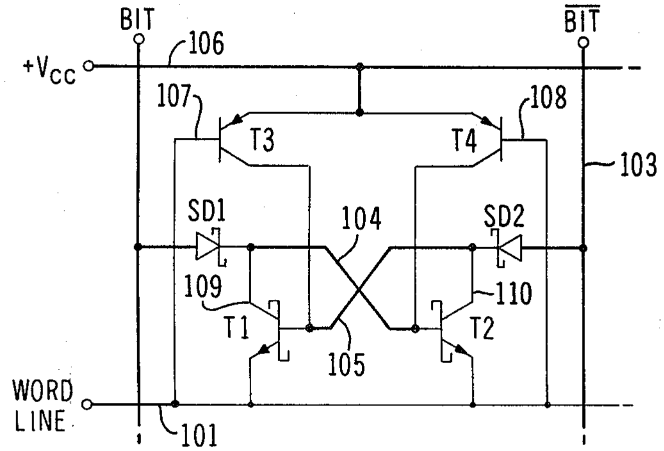
FIG. 2
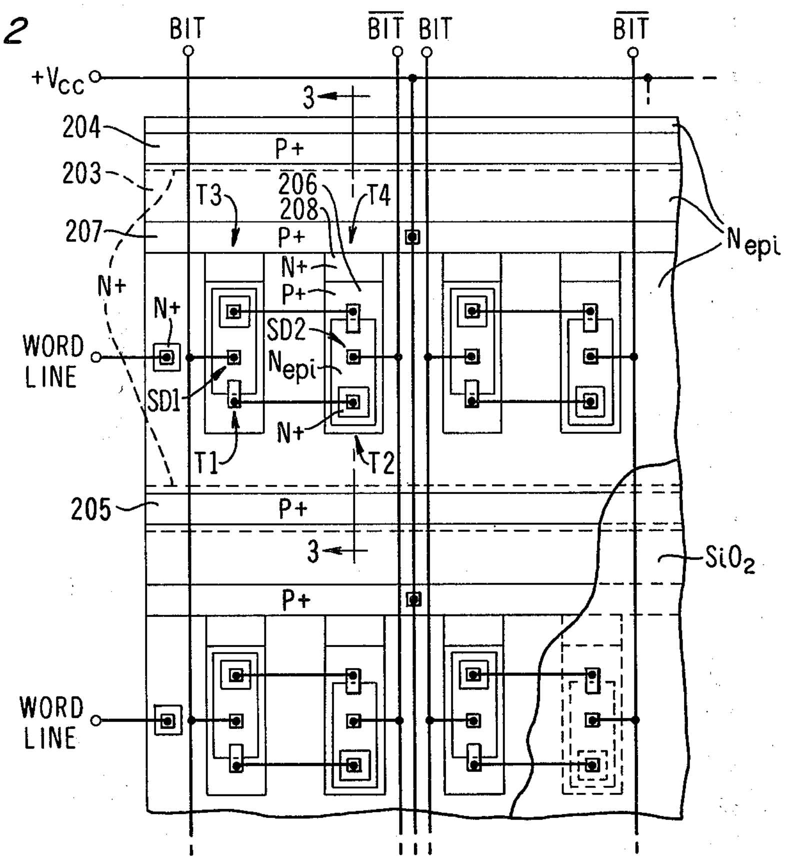
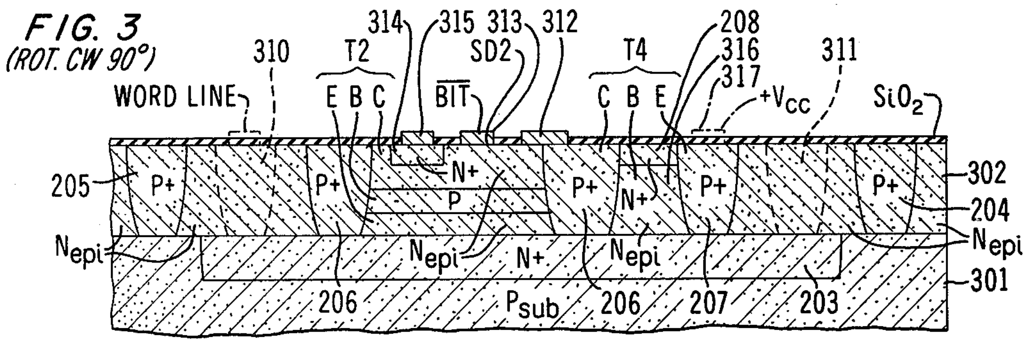
FIG. 3 (ROT. CW 90°)

INTEGRATED CIRCUIT MEMORY CELL

BACKGROUND OF THE INVENTION

This invention relates to an improved memory cell for an integrated circuit memory arrangement.

In the design, construction, and application of digital memories there are many characteristics of importance. Among these characteristics are: cost, ease of manufacture, reproducibility, circuit density, power consumption, reliability, and speed of operation. These characteristics are all dependent on the physical structure utilized and the method of manufacture of the structure. Ideally, a physical structure which is capable of high speed operation with low power consumption and good reliability is easy to construct and, therefore, low in cost.

SUMMARY OF THE INVENTION

A memory comprises a plurality of multibit words, and the external connections to the memory in addition to power comprise one word line for each word of the memory and one bit line or a pair of bit lines (bit and $\overline{\text{bit}}$) for each bit of the words for the memory. In accordance with the present invention a cell (the structure for one data bit) of an integrated memory comprises two directly interconnected identical halves which halves are each integrally formed without surface metal interconnections. The memory is fabricated from a semiconductor body which comprises an epitaxial layer of one conductivity type overlying a semiconductor substrate of the opposite type in which isolated strips of the first conductivity type have been priorly diffused to form the word lines. Each cell half comprises a vertical transistor, e.g., a vertical npn transistor, having the collector at the exposed surface of the epitaxial layer and a lateral current source transistor, e.g., a pnp. The collector region of each vertical transistor has two metallized contacts, one to form a Schottky diode for connection to a bit line and one to form an ohmic connection for cross-coupling of the two halves. Power is distributed by a line diffused in the epitaxial layer which line comprises the emitters of the lateral current source transistors and power is returned through the word lines. The current source transistors are connected to and are controlled by their respective word lines. Accordingly, the pulsing of a word line to access the associated word serves to shift the voltage in the bit lines in accordance with the states of the cells of the word and also increases the current supplied by the current source transistors.

Advantageously, a memory cell constructed in accordance with this invention utilizes a small area on the body, is readily reproducible, requires low power consumption, and exhibits high speed of operation.

Further, in accordance with an aspect of this invention, the two identical halves of a cell each comprise a vertical transistor which is formed in an epitaxial layer of one conductivity type wherein a first region of the opposite conductivity type, throughextending from the exposed surface of the epitaxial layer to the substrate, encircles a region of the epitaxial layer wherein a base region of the said opposite conductivity type is placed by ion implantation between but spaced apart from the surfaces of the epitaxial layer. The lateral current source transistor is formed from a portion of said aforenoted throughextending encircling region of said opposite conductivity type, a further throughextending region of said opposite conductivity type which region is spaced apart from, but in active relationship with, said first throughextending region, and a portion of the epitaxial layer which separates the two throughextending regions.

Advantageously the memory transistors so constructed exhibit favorable electrical characteristics because of the desirable impurity profile of the implanted base region. Implanation of the base region produces a substantially symmetrical impurity profile relative to the buried and exposed surfaces of the epitaxial layer. Accordingly, the vertical memory transistors may be operated with the collectors at the exposed surface of the epitaxial layer without penalty of electrical performance.

BRIEF DESCRIPTION OF THE DRAWING

FIG. 1 is a schematic diagram of a memory cell;

FIG. 2 shows a possible layout of a plurality of cells of FIG. 1;

FIG. 3 is a cross section of a physical embodiment of a portion of the circuit of FIG. 1;

DETAILED DESCRIPTION

Figure 4:
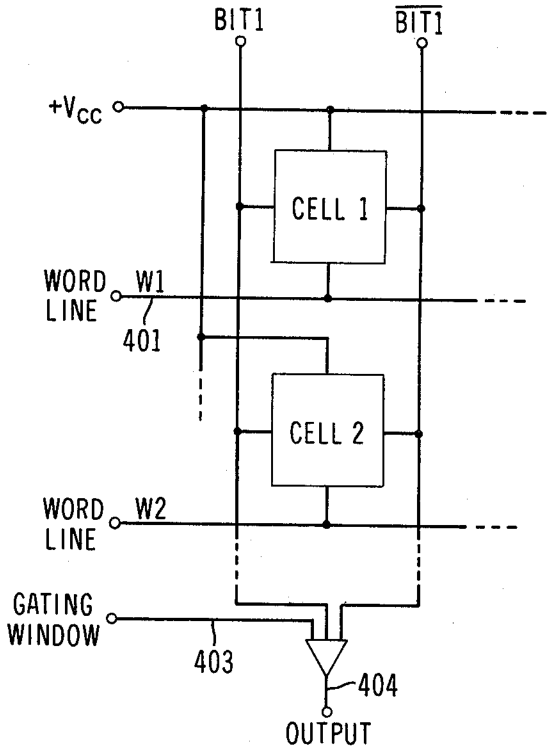
FIG. 4 is a schematic diagram showing the interconnection of corresponding bits of two adjacent words.

A memory cell such as is shown in FIG. 1 is utilized in digital memories which comprise *n* words of *m* bits per word. The word line 101 of FIG. 1 is energized from an accessing circuit which is not shown and a word line is common to all of the *m* bits of the word. The two bit lines (bit and $\overline{\text{bit}}$) are connected to reading and writing circuits again not shown in the drawing. The bit lines serve corresponding bits of each word of the memory. Therefore, where each memory word comprises *m* bits there are *m* pairs of bit lines. The signal sources for energizing the word lines and the bit lines and for receiving signals from the bit lines are not described herein since these circuits are not essential to an understanding of the present invention. To the contrary, such detail would merely tend to obscure the present invention and for the practice of this invention it is sufficient to understand the characteristics of the signals which occur on the word lines and on the bit lines. Such characteristics will be described in the discussion of the operation of the circuit of FIG. 1

In FIG. 1 the transistors T1 and T2 along with their current source transistors T3 and T4, respectively, constitute a directly cross-coupled flip-flop circuit. One half of that flip-flop circuit comprises a memory transistor, e.g., T1, a current source transistor, e.g., T3 and an output diode, e.g., SD1, while the other half of the cell of FIG. 1 comprises the memory transistor T2, the current source transistor T4, and the output diode SD2. The elements of a cell half are formed in a way such that the elements thereof are interconnected without any external surface metalization. The two halves are interconnected by the cross-coupling lines 104 and 105 while the bit lines 102 and 103 and the word line 101 are each connected directly to the cell devices. Such external connections are described and are more apparent in the subsequent discussion of FIG. 2. The memory transistors T1 and T2 are shown in FIG. 1, 2, and 3 as comprising Schottky diode clamped transistors. However, this is ana optional aspect of the circuit arrangement of FIG. 1 and the memory transistors T1, T2 may be fabricated with or without the clamping diodes.

The cell of FIG. 1 requires the application of positive potential ($V_{cc}$) which is applied to the terminal 106. Power is supplied to the memory cell transistors T1 and T2 by their current source transistors T3 and T4. As seen in FIG. 1 the bases 107, 108 of the current source transisitors T3 and T4 are connected to be controlled by the potential on the word line 101. These transistors are held in the conducting state at all times, however, except at the times at which a word is being accessed for purpose of reading or writing, the conduction of the transistors T3 and T4 is held to a low value in order to minimize the power dissipated in the memory. This low value of current is adequate to assure stable operation of the necessary cels. Typically, the word line 101 is pulsed so as to increase the flow of current through the transistors T3 and T4 to a value which is consistent with reading and writing of the cell and to shift the voltage which occurs on the collectors 109 and 110 of the transistors T1 and T2. When the memory cell is accessed for purposes of reading the contents of that cell, circuitry which is attached to the bit lines 102 and 103 observes the differential potential between these lines to determine the state of a memory cell which is accessed. The potential at the bit lines 102 and 103 reflects the potential at the collectors 109 and 110 of the transistors T1 and T2, respectively. One of the two transistors T1 and T2 will be in the conducting state and its collector will be at a voltage near the potential on the word line 101 and the other transistor of the pair will be in the nonconducting state and its collector will be at a potential which is substantially above the potential of the word line 101. The Schottky diodes SD1 and SD2 serve to decouple the memory cells from their respective bit lines, therefore, only the memory cells in which the word line is pulsed will be effective to reflect their state to the associated bit lines, e.g., 102, 103. For the purpose of writing new information into a memory cell such as shown in FIG. 1, coincident with the pulsing of the word line 101, one of the two bit lines of each pair is pulsed to force the memory cell to the desired state. The above described manner of operation is consistent with the operation of prior art memories which provide for reading and writing of information of a memory cell.

Figure 5:
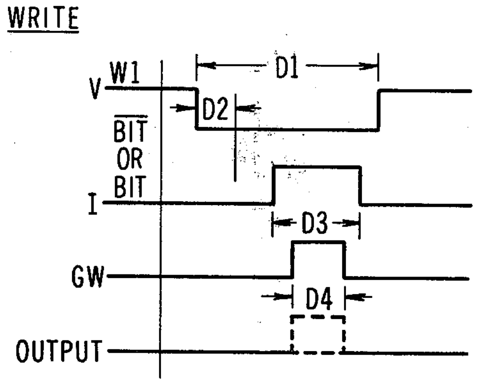
FIG. 5 is a timing diagram for the reading of information from a memory cell.

In FIG. 4 there is illustrated the connection of one cell of each of two words to the bit lines which are common to those cells. The words of FIG. 4 are arbitrarily labeled "W1" and "W2" and the one bit that is illustrated is labeled "bit 1". As explained above herein, a word is accessed for reading or for writing by pulsing the corresponding word line, e.g., the line 401. In the mode of operation described above the differential potentials on the lines bit 1 and $\overline{\text{bit 1}}$ are observed to determine the state of the corresponding cell of the accessed word. The speed of operation of reading the memory can be increased if the pulsing of the word line is accompanied by a pulsed increased in current on both bit lines. A typical sequence of events in the reading of a memory cell is illustrated in FIG. 5 which is intended to show timing relations only. Accordingly, the amplitudes of the signals illustrated in FIG. 5, as well as in FIG. 6 to be described later herein, are not drawn to a significant scale. As shown in FIG. 5 the word line is pulsed in a negative direction with a pulse having a duration D1. The interval of time labeled D2 is chosen such that the current source transistors T3 and T4 of an access cell have reached a high current state before the bit lines are pulsed. As illustrated in the second line of FIG. 5 the current on the lines bit 1 and $\overline{\text{bit 1}}$ is increased for a period of time designated as D3 which time occurs during the time D1 but after the passage of the interval time D2. The signals on the lines bit 1 and $\overline{\text{bit 1}}$ are interpreted by the differential gated amplifier 402 which is enabled by a window signal which is applied to the conductor 403. The window signal, as illustrated in the third line of FIG. 5, has a time duration D4 which is shorter than the time duration D3 and is nominally centered within the period of time D3. The output of the gated differential amplifier 402 occurs on the output conductor 404 in the time relationship shown in line 4 of FIG. 5.

As explained earlier herein the total power consumed by a memory array in accordance with the illustrative embodiment of this invention is held to a relatively low value by controlling the current source transistors T3 and T4 by the potential applied to the word lines. As illustrated in FIG. 5 this mode of operation incurs a slight penalty in that the time D2 must be allowed for the memory transistors T1 and T2 to reach a sufficiently high state of current conduction to insure that they will not be unintentionally affected by the current signal applied to the lines bit 1 and $\overline{\text{bit 1}}$. It should be noted that at the penalty of the consumption of added power it is possible to run the transistors T3 and T4 at a higher state of conduction at all times thereby reducing the time D2.

Figure 6:
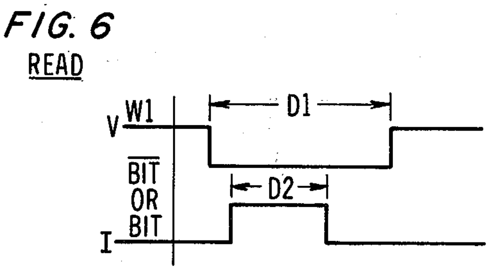
FIG. 6 is a timing diagram for the writing of information into a memory cell.

The timing relationship of signals utilized to write new information into a memory cell is illustrated in FIG. 6. The negative going signal shown in line 1, FIG. 6, having a time duration D1 corresponds to the signal shown in line 1 of FIG. 5 and is utilized to access a word of the memory. The signal shown in line 2 of FIG. 6 is selectively applied to the line bit 1 or $\overline{\text{bit 1}}$ to write information into the corresponding cell of the accessed word. It should be noted that the current utilized in writing and applied to one of the bit lines bit or $\overline{\text{bit}}$ is larger than the currents applied to these lines during reading. A positive pulse applied to the line bit 1 will force the memory transistor T2 of the corresponding cell into a conduction which in turn will take the memory transistor T1 out of conduction. Similarly, a positive signal to the line $\overline{\text{bit 1}}$ will force the memory transistor T1 into conduction and take the memory transistor T2 out of conduction. As seen in FIG. 6 the write signal need not be delayed for the period of time D2 but rather can be applied at any time during the time D1 of the access pulse.

The alphanumeric legend associated with the elements of FIG. 1 is carried over into FIG. 2 and 3 to assist in the understanding of the construction of a plurality of circuits such as shown in FIG. 1. FIG. 2 is a top view of a portion of a memory arrangement which illustrates the construction of two cells of each of two words and an understanding of the structure shown in cross section in FIG. 3 may be helpful to an understanding of FIG. 2. The arrangement shown in FIG. 3 utilizes structure set forth in copending patent application Agraz-Guerena - Fulton Case 2-3, application Ser. No. 502,674 filed of even date herewith. In FIG. 3 the semiconductor body comprises the substrate 301 and an overlying epitaxial layer 302. In the illustrative embodiment of FIG. 1, 2, and 3 the semiconductor substrate is of P conductivity type, the epitaxial layer is of an N conductivity type, and there are a plurality of strips of N+ conductivity regions diffused into the substrate prior to formation of the epitaxial layer 302. In FIG. 2 a word line is defined by the region lying within the dotted lines labeled N+ in the region of the upper two cells of FIG. 2. As shown in FIG. 2 and 3 there are two P+ regions 204 and 205 which are throughextending from the exposed surface of the epitaxial layer to the substrate. These P+ regions are formed outside the portion of the epitaxial layer overlying the word lines, e.g., 203, and serve as isolation between adjacent words in the epitaxial layer.

As previously noted, the cross section of FIG. 3 is taken through the structure of the transistors T2 and T4 as indicated by the section lines in FIG. 2. FIG. 3 thus looks sidewise into the structure of transistors T2 and T4 with transistor T2 on the left. As previously described, the transistors T1 and T2 are the memory transistors which are cross-coupled to form a flip-flop and transistors T3 and T4 are current source transistors for their corresponding memory transistors Also, as previously described, the memory transistors T1 and T2 are vertical transistors while the transistors T3 and T4 are lateral transistors.

In FIG. 3 there are two regions, 310 and 311, which are shown by dotted lines. These regions typically comprise a throughextending N+ diffusion or alternatively regions of silicon dioxide. The regions 310 and 311 are shown as dotted lines since their presence is optional if there is adequate space separating elements of adjacent cells to prevent undesired lateral transistor action. The throughextending P+ region 206 shown in plan view in FIG. 2 and in cross section in FIG. 3 encircles a portion of the epitaxial layer wherein a vertical memory transistor, e.g., transistor T2, is formed. The base of the transistor T2 comprises a P conductivity type zone which is formed by ion implantation. This base is connected to the surface of the epitaxial layer by the throughextending P+ region 206. The collector of the transistor T2 comprises a region of the epitaxial layer which lies above the implanted base region and in the illustrative embodiment of FIG. 3 there are three metallized connections to that collector region. The first metallized connection 312 is of a material selected to provide a Schottky diode connection between the collector and the base of the transistor T2. That is, the metallized region 312 forms a Schottky diode connection to the collector and an ohmic connection to the throughextending P+ region 206. This Schottky diode provides the optional clamped diode configuration of the memory transistor T2. The second metallized connection to the collector T2 is labeled 313 in FIG. 3 and comprises the Schottky diode SD2 which provides coupling between the collector of the transistor T2 and its corresponding $\overline{\text{bit}}$ 103. As shown in FIG. 3 there is a small N+ region 314 to which the ohmic metal connection 315 is attached. This ohmic connection provides the mechanism for cross-coupling the collector of transistor T2 to the base of transistor T1.

The lateral current source transistor T4 of FIG. 1 is formed of the following elements: the collector and emitter comprise active portions of regions 206 and 207, respectively, and the base comprises an active portion of the zone of the epitaxial layer labeled 316 in FIG. 3. Power ($V_{cc}$) is applied to the emitter 207 by means of the metallized connection 317. Since the region 206 forms the collector of the transistor T4 and provides a connection to the base of the memory transistor T2 there is no requirement for surface metallization to provide power to the memory transistor T2. The N+ region 208 at the surface overlying the base region 316 serves to improve the performance of the lateral source transistor by preventing recombination of minority carriers at the exposed surface and thus increases the gain of lateral current source transistor.

The foregoing discussion describes the structure of the transistors T2 and T4 and the Schottky diode SD2 which comprise one of the two identical halves of a memory cell such as shown in FIG. 1. The other half of the memory cell of FIG. 1 comprising the transistor T1, the transistor T3, and the Schottky diode SD1 is similarly formed over the word line 203. However, as shown in plan view FIG. 2 the physical positions of the Schottky diode connections and the ohmic connections to the collector region are interchanged in the two halves to provide for simple interconnection of the two halves by surface metallization.

What is claimed is:

1. A memory cell for an integrated circuit memory comprising:
- a flip-flop comprising first and second directly cross-coupled memory transistors each having a base, a collector, and an emitter;
- first and second bit output lines;
- means coupling said collectors of said first and second memory transistors with said first and second bit output lines respectively;
- first and second current source transistors each comprising a base, a collector and an emitter, the emitters of said current source transistors connected one to the other and arranged to be connected to a source of potential, the collectors of said first and second current source transistors connected respectively to said bases of said first and second memory transistors; and
- a word line connected to the emitters of said first and second memory transistors and to the bases of said current source transistors.

2. A memory cell for an integrated circuit memory in accordance with claim 1 wherein said coupling means comprises first and second Schottky diodes formed at said collectors of said first and second memory transistors.

3. A memory cell in accordance with claim 1 wherein said first and second memory transistors each comprise a Schottky diode clamped transistor.

4. A memory cell for an integrated circuit memory comprising two identical halves, each half integrally formed without surface metal interconnections and comprising:
- an npn memory transistor;
- a pnp current source transistor having its collector formed integrally with the collector of said memory transistor;
- a bit line;
- a Schottky diode formed on the collector of said memory transistor and interconnecting said collector and said bit line;
- a word line connected directly to the emitter of said memory transistor and to the base of said current source transistor;

a power line formed integrally with the emitter of said current source transistor;

terminal means for applying a source of potential to said power line; and surface metal interconnecting means cross-connecting the bases and collectors of the memory transistors of two halves to form a flip-flop circuit.

5. A memory cell for an integrated circuit memory array comprising:

a flip-flop comprising first and second directly cross-coupled Schottky diode clamped transistors;

first and second bit output lines;

first and second Schottky diodes connected respectively between said first and second bit lines and the collectors of said first and second transistors;

first and second current source transistors having their emitters connected one to the other and arranged to be connected to a source of potential and having their collectors connected respectively to said collectors of said first and second cross-coupled transistors; and a word line connected to the emitters of said first and second cross-coupled transistors and to the bases of said current source transistors.

6. An integrated circuit memory formed in a body comprising:

a semiconductor substrate wherein a plurality of substantially parallel but spaced apart word lines of one conductivity type are diffused and an epitaxial layer of said one conductivity overlying said substrate, said memory comprising:

a plurality of bit lines, said plurality corresponding in number to the number of bits in each memory word;

a plurality of cells for each of said word lines, said plurality of cells corresponding in number to the number of bits in each memory word, each of said cells comprising two interconnected halves, each said half being formed in said body without surface metal interconnections and comprising:

a vertical memory transistor formed in a first region of said epitaxial layer defined by a region of the opposite conductivity type extending through said epitaxial layer from the exposed surface thereof to the substrate and encircling said first region, each said memory transistor comprising a collector region of said first conductivity type at the exposed surface of said epitaxial layer an emitter region of said first conductivity type adjacent to the buried surface of said epitaxial layer and a base region of said opposite conductivity type formed by ion implantation in said first region but spaced apart from said exposed and said buried surfaces of said epitaxial layer;

a lateral current source transistor formed in said epitaxial layer and comprising:

a collector region formed of part of said throughextending region of said opposite conductivity type, an emitter formed of a further throughextending region of said opposite conductivity type spaced apart from but in operational relationship with said first named throughextending region, and a base comprising an active portion of the epitaxial layer intermediate said throughextending regions of said opposite conductivity type;

means for applying potential to said second throughextending region of said opposite conductivity type, a Schottky diode formed at the collector of said memory transistor for interconnecting a corresponding bit line to said half, an ohmic connection to said collector of said memory transistor and conductor means for interconnecting said ohmic connection of one cell half to the base of a memory transistor of another half.

* * * * *